US012680458B2

(12) United States Patent
Votie et al.

(10) Patent No.: US 12,680,458 B2
(45) Date of Patent: Jul. 14, 2026

(54) MODULE FOR AN AIRCRAFT TURBINE ENGINE

(71) Applicant: SAFRAN HELICOPTER ENGINES, Bordes (FR)

(72) Inventors: Sylvain Pierre Votie, Moissy-cramayel (FR); Frederic Philippe Jean-Jacques Pardo, Moissy-cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/846,615

(22) PCT Filed: Mar. 23, 2023

(86) PCT No.: PCT/FR2023/050414
§ 371 (c)(1),
(2) Date: Sep. 12, 2024

(87) PCT Pub. No.: WO2023/180668
PCT Pub. Date: Sep. 28, 2023

(65) Prior Publication Data

US 2025/0101874 A1 Mar. 27, 2025

(30) Foreign Application Priority Data

Mar. 24, 2022 (FR) ...................................... 2202637

(51) Int. Cl.
*F01D 9/04* (2006.01)
*F01D 11/00* (2006.01)
*F01D 25/24* (2006.01)

(52) U.S. Cl.
CPC ............ *F01D 9/041* (2013.01); *F01D 11/005* (2013.01); *F01D 25/24* (2013.01); (Continued)

(58) Field of Classification Search
CPC ........ F01D 9/041; F01D 11/005; F01D 25/24; F01D 25/246; F05D 2220/323; (Continued)

(56) References Cited

U.S. PATENT DOCUMENTS 2,997,275 A 8/1961 Bean et al.
4,768,924 A * 9/1988 Carrier .................... F01D 9/042 415/138
(Continued)

FOREIGN PATENT DOCUMENTS

EP 1515004 A1 3/2005
EP 2218918 A1 8/2010

OTHER PUBLICATIONS

International Search Report received for PCT Patent Application No. PCT/FR2023/050414, mailed on Jul. 10, 2023, 5 pages (2 pages of English Translation and 3 pages of Original Document).

*Primary Examiner* — Brian Christopher Delrue
(74) *Attorney, Agent, or Firm* — WOMBLE BOND DICKINSON (US) LLP

(57) ABSTRACT

A turbine engine module, in particular an aircraft turbine engine, including an annular casing having an internal wall forming a channel wall; and a nozzle surrounded by the casing and including an annular external platform and an annular internal platform between which stator blades extend, the external platform having an external face that faces the internal wall of the casing and includes an annular groove oriented towards the outside and housing a sealing device, the sealing device coming into cylindrical contact with a track of the internal wall of the casing, wherein the internal wall of the casing includes a thermal barrier made of ceramic material directly above the track, the track being arranged between the thermal barrier and the sealing device.

19 Claims, 6 Drawing Sheets

(52) U.S. Cl.
CPC .... *F05D 2220/323* (2013.01); *F05D 2240/12* (2013.01); *F05D 2240/14* (2013.01); *F05D 2240/55* (2013.01); *F05D 2260/231* (2013.01)

(58) Field of Classification Search
CPC ............. F05D 2240/12; F05D 2240/14; F05D 2240/55; F05D 2260/231; F05D 2220/329; F05D 2240/15; F05D 2300/20; F05D 2300/2118; F05D 2300/5024; F05D 2300/6033
See application file for complete search history.

(56) References Cited

U.S. PATENT DOCUMENTS

| | | | | | |
|---|---|---|---|---|---|
| 5,269,651 | A * | 12/1993 | Ostermeir | F01D 9/041 | 415/137 |
| 6,062,813 | A * | 5/2000 | Halliwell | F01D 25/246 | 415/173.1 |
| 6,916,154 | B2 * | 7/2005 | Synnott | F01D 9/041 | 415/209.1 |
| 8,033,786 | B2 * | 10/2011 | Durocher | F01D 9/042 | 416/208 |
| 8,177,495 | B2 * | 5/2012 | Bowes | F01D 11/001 | 415/174.4 |
| 9,797,515 | B2 * | 10/2017 | Kloepfer | F01D 25/246 | |
| 10,202,859 | B2 * | 2/2019 | Biemar | F01D 9/042 | |
| 10,233,782 | B2 * | 3/2019 | Stafford | F01D 17/167 | |
| 2004/0219014 | A1 * | 11/2004 | Synnott | F01D 9/041 | 415/209.2 |
| 2005/0056025 | A1 | 3/2005 | Lepretre et al. | | |
| 2009/0214331 | A1 * | 8/2009 | Jewess | F02K 3/00 | 415/198.1 |
| 2011/0311355 | A1 | 12/2011 | Benkler et al. | | |
| 2013/0078084 | A1 * | 3/2013 | Gendrich | F01D 5/20 | 415/173.1 |
| 2018/0106160 | A1 * | 4/2018 | Thomas | F01D 11/08 | |

* cited by examiner

MODULE FOR AN AIRCRAFT TURBINE ENGINE

TECHNICAL FIELD OF THE INVENTION

This invention relates to a module for a turbine engine, in particular an aircraft turbine engine. The invention also concerns a turbine engine, in particular of an aircraft, comprising such a module.

TECHNICAL BACKGROUND

The technical background includes in particular the document US 2004/219014 A1.

An aircraft turbine engine, for example an aeroplane or helicopter, comprises an air inlet feeding a gas generator which comprises, from upstream to downstream, by reference to the flow of gases, at least one compressor, an annular combustion chamber, and at least one turbine for driving the compressor in rotation.

Such an aircraft turbine engine extending along a turbine engine axis enables the aircraft to be moved by the flux of air entering the turbine engine and circulating from upstream to downstream. Hereafter, the terms "upstream" and "downstream" are defined in relation to the axis of the turbine engine oriented from upstream to downstream. Similarly, the terms "inner" and "outer" are defined in a radial direction with respect to the axis of the turbine engine.

FIG. 1 is a longitudinal half-section view of an example of a turbine engine 10 with longitudinal axis X. This comprises a casing 12 in which is housed a gas generator 14. This comprises a gas generator shaft 15 carrying a centrifugal compressor wheel 16 and a high-pressure turbine 18. Fresh air F1 enters the turboshaft engine via an air inlet 20 and flows into an annular duct 30. It is then compressed by the compressor 16 before being sent to a combustion chamber 22 where it is mixed with fuel. The combustion of the compressed air/fuel mixture generates a flux of hot gas F2 which causes the high-pressure turbine 18 to rotate, which in turn drives the compressor 16.

On leaving the combustion chamber 22, the hot gas flux F2 passes through at least one bladed stator 32 comprising a wheel of fixed blades also known as stator blades 34. The function of this stator is to direct the relatively axial flux generated by combustion, so as to create a gyratory flux before entering the high-pressure turbine 18. Such stator blades 34 are for example fixed to a radially external wall of the duct 30, which corresponds to an external annular platform 36 of the stator 32. The stator blades 34 extend longitudinally between the external annular platform 36 of the stator 32 and an internal annular platform 37 of the stator 32 forming a radially internal wall of the duct 30. The high-pressure turbine 18 comprises at least one disk which carries blades 38 and can rotate about an axis of rotation, the longitudinal axis X of the turbine engine.

FIG. 2 shows a partial three-dimensional cross-sectional view of the framed zone of the turbine engine in FIG. 1. FIG. 3 illustrates in more detail the framed zone of the turbine engine in FIG. 2.

In this example, the turboshaft engine also comprises a low-pressure turbine wheel 26 attached to a turbine shaft 28. As shown in FIG. 1, the low-pressure turbine wheel 26 is located downstream of the high-pressure turbine wheel 18. Consequently, the flux of burnt gases leaving the gas generator 14 drives the turbine shaft 28 in rotation. In this case, the turbine engine has at least one other bladed stator 42, known as inter-turbine stator, since it is arranged between the high-pressure turbine 18 and the low-pressure turbine 26. The function of this inter-turbine stator 42 is to direct the quasi-axial flux at the outlet of the high-pressure turbine 18, so as to create a gyratory flux before entering the low-pressure turbine 26. The inter-turbine stator 42 similarly comprises a wheel of fixed blades known as inter-turbine stator blades 44.

It is well known that the turbine engines comprise static sealing systems, which are essential for limiting leakage rates that are detrimental to engine performance. The leaks are all the more critical where there are large pressure differences across the zones to be sealed.

One of the existing solutions for sealing zones subject to pressure differences between two static parts is a segment seal. These segment seals are found in many zones of a turbine engine. The four circled zones Z1, Z2, Z3 and Z4 in the turbine zone of the turbine engine in FIG. 1 illustrate examples of the locations of four segment seals. These sealings allow to prevent the bypassing of the turbine grids (bladed stators and impeller blades) to avoid losses in component efficiency (these grids are subject to pressure differences between the inlet and outlet of the grid).

In hot zones of the turbine engine, the static sealings around the duct can cause adjacent parts to heat up by conduction. FIG. 3 illustrates the flux of hot air circulating in the duct, noted F3, which propagates by conduction through the sealing device 60 (arrows F6) to the internal casing 52, which is cooled by a flux of fresh air F5 circulating between the combustion chamber 22 and the internal casing 52. In many cases, this heating degrades the functions of these parts, for example by increasing the clearance between rotor and stator, resulting in a deterioration in motor performance, or by heating the oil in a bearing.

The main areas requiring air cooling are the combustion chamber and the turbine. Cooling air is used to control the temperature of the compressor shafts and disks by cooling or heating them. This ensures uniform temperature distribution and therefore improves motor efficiency by controlling thermal growth and thereby maintaining minimum clearances at the ends of the vanes and seals.

At present, only complex and costly solutions, such as pins, double skins or deflectors, are used to overcome these problems. In fact, these solutions require sufficient available space to be installed. In general, these are costly additional parts that require assembly solutions, which are themselves expensive (welding, brazing, flanges, etc.) when space permits, which is not always the case. What's more, they also make a significant contribution in terms of mass.

The purpose of the invention is to propose a solution allowing to remedy at least some of these disadvantages.

SUMMARY OF THE INVENTION

The invention relates to a turbine engine module, in particular an aircraft turbine engine, comprising:

- an annular casing having an inner wall forming a channel wall, and
- a bladed stator surrounded by the casing and comprising an annular external platform and an annular internal platform between which stator blades extend, the external platform having an outer face facing the internal wall of the casing comprising an annular slot oriented towards the outside and housing a sealing device, the sealing device coming into cylindrical contact with a track of the internal wall of the casing.

According to the invention, the internal wall of the casing comprises a thermal barrier made of ceramic material directly above the track, the track being arranged between the thermal barrier and the sealing device.

The invention thus allows at least some of the above disadvantages to be remedied by a simple solution. In fact, the invention proposes interposing a thermal barrier between the sealing device and the zone to be thermally protected. Advantageously, this thermal barrier is made of ceramic material, which has much greater insulating characteristics than steel.

This solution has the advantage of being geometrically neutral and very easy to integrate into current and future turbine engines, which is all the more advantageous in confined environments.

The invention is thus easily and advantageously applicable for protecting casings and bearings, whether from a thermal point of view or from the point of view of frictional wear, particularly in a geometrically confined environment.

The solution proposed by the invention is simple to implement and easy to repair. It does not require complex mechanical assembly.

The module according to the invention may comprise one or more of the following characteristics, taken alone or in combination with each other:

- the internal wall of the casing has a radially inner face carrying the track which comes into cylindrical contact with the sealing device and a radially outer face opposite the inner face and comprising an annular groove directly above the track, the groove having a base covered by the thermal barrier made of ceramic material;
- the ceramic material of the thermal barrier has a thermal conduction coefficient substantially between 0.5 and 2.5 W/(m·° C.), preferably between 1 and 2 W/(m·° C.);
- the ceramic material of the thermal barrier is of the yttria-stabilized zirconia type;
- the ceramic material of the thermal barrier is of the ceramic matrix composite (CMC) type;
- the thermal barrier made of ceramic material has a thickness of between 0.5 and 1.5 mm, preferably between 0.8 and 1 mm;
- the sealing device comprises two annular segment seals placed side by side and housed in the annular slot of an outer face of the external platform of the rectifier;
- the sealing device comprises at least one annular seal housed in the annular slot of the outer face of the external platform of the rectifier, the seal being of the C-seal or laminated seal or Omega seal type or a segmented ring seal.

The invention also relates to a turbine engine, in particular of an aircraft, comprising a module as described above.

BRIEF DESCRIPTION OF THE FIGURES

The invention will be better understood and further characteristics and advantages will become apparent from the following detailed description comprising embodiments, given by way of illustration with reference to the appended figures and presented as non-limiting examples, which may serve to complete the understanding of the present invention and the disclosure of its embodiment and, where appropriate, contribute to its definition, whereupon.

The elements having the same functions in the different embodiments have the same references in the figures.

DETAILED DESCRIPTION OF THE INVENTION

The invention applies to a turbine engine intended to be mounted on an aircraft, such as an aeroplane or helicopter. The turbine engine can be a turboshaft engine, a turbojet engine, for example a turbine engine equipped with a ducted fan (turbofan) or a turboprop, for example a propulsion unit equipped with an unducted propeller ("open rotor", "USF" for "Unducted Single Fan" or "UDF" for "Unducted Fan"). Of course, the invention can be applied to other types of turbine engines, whether dual or single flow, such as the one illustrated in FIG. 1.

Figure 1:
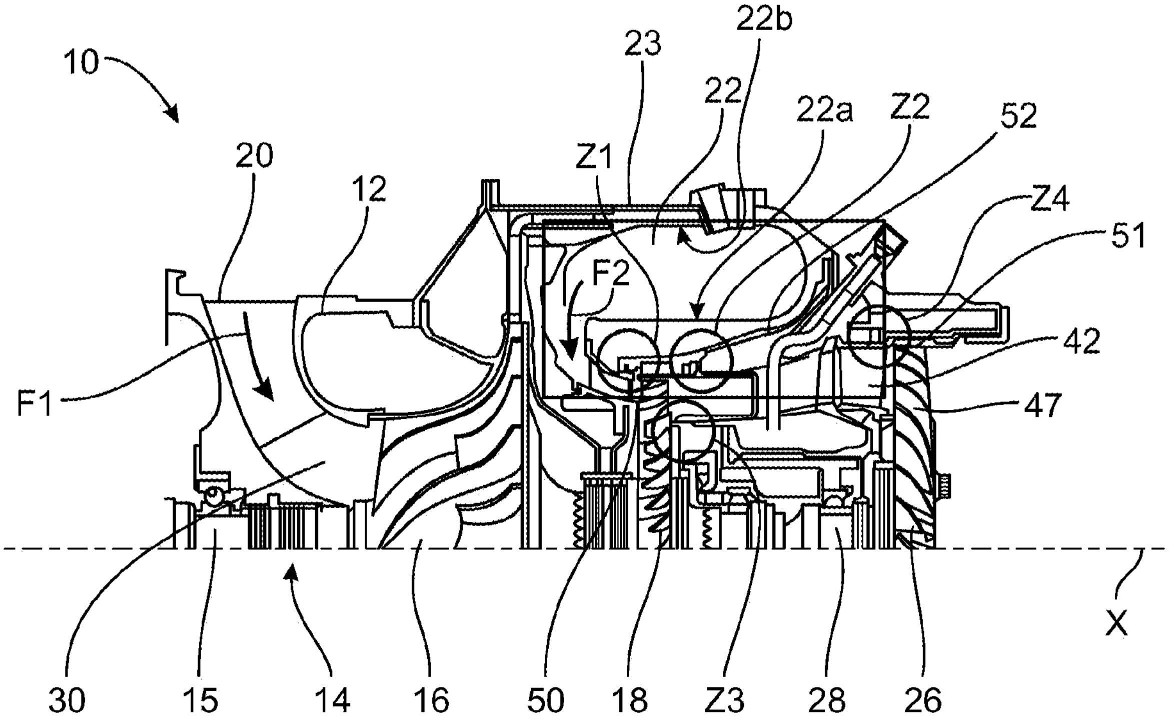
FIG. 1, already described, is a schematic half-view in axial (or longitudinal) section of part of an aircraft turbine engine to which the invention applies.
Figure 2:
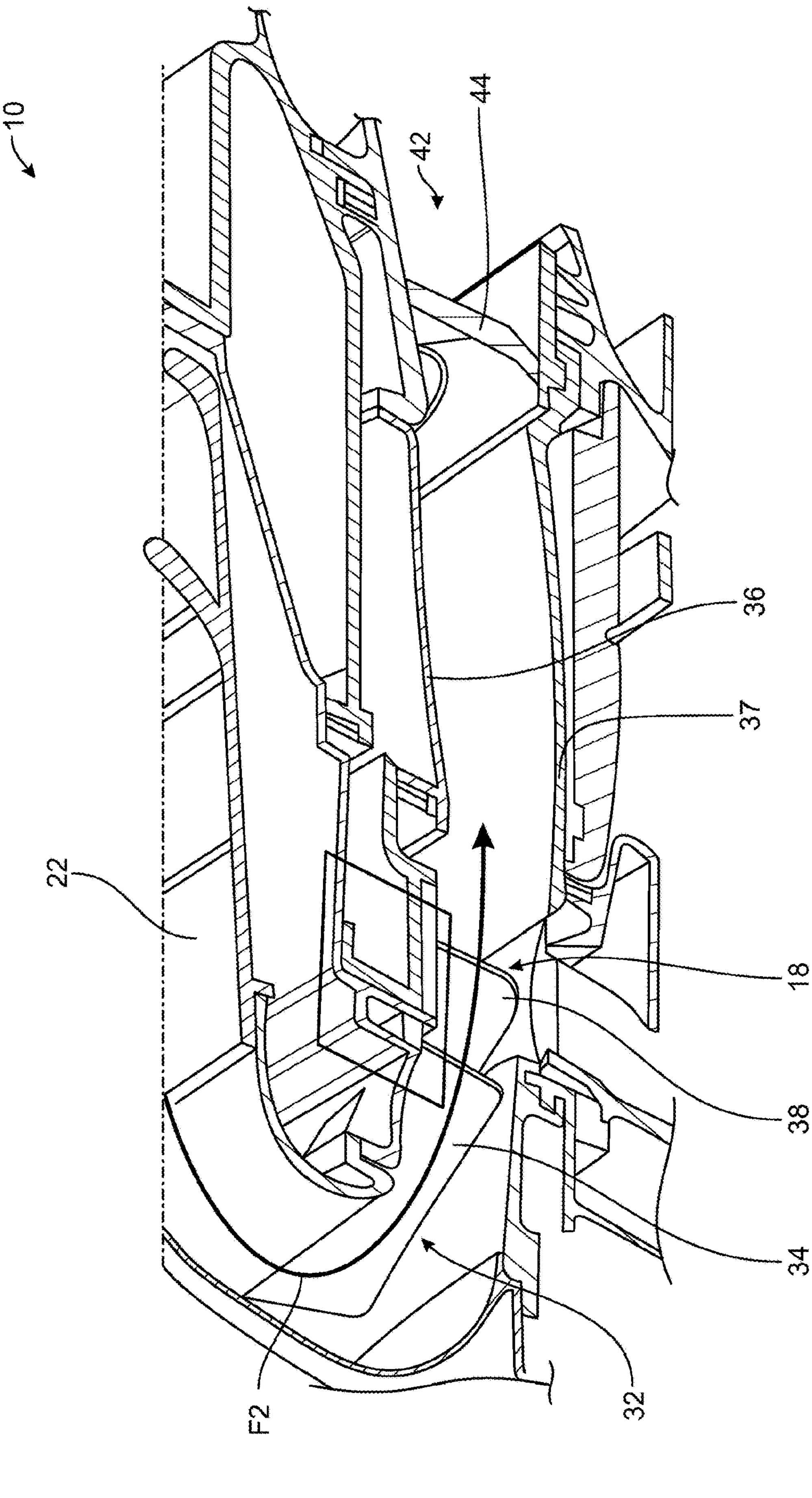
FIG. 2, already described, shows a partial three-dimensional cross-sectional view of the framed zone of the turbine engine in FIG. 1.
Figure 3:
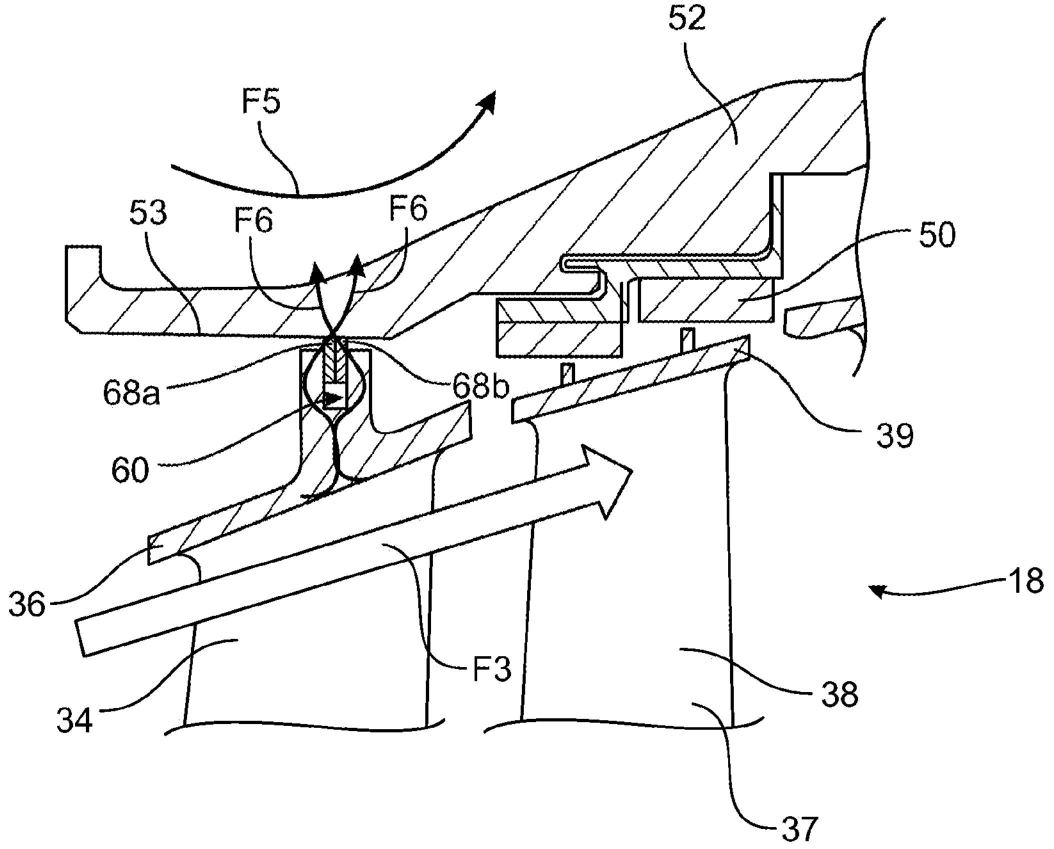
FIG. 3, already described, illustrates in greater detail the framed zone of the turbine engine in FIG. 2 according to the prior art.

FIG. 1 shows part of an aircraft turbine engine 10, such as a helicopter turbojet engine. The turbine engine 10 comprises from upstream to downstream, with reference to the direction of gas flow (see arrows), an air inlet 20, at least one compressor 16, an annular combustion chamber 22, and at least one turbine 18.

The air entering the engine through air inlet 20 is compressed in compressor 16, in this case a centrifugal compressor. The compressed air flows radially towards the outside and feeds the combustion chamber 22.

The combustion chamber 22 comprises two annular walls, an internal wall **22*a* and an external wall 22*b*. The external annular wall 22*b* extends around the internal annular wall 22*a*. The internal and external annular walls 22*a* and 22*b* are themselves arranged inside an external casing 23 of the combustion chamber 22. This external casing 23 is attached at an upstream end to the casing 12 of the compressor 16 and the air inlet 20**.

The compressed air is mixed with fuel and then burnt in the combustion chamber 22, generating combustion gases which are then injected into the turbines 18, 26.

A high-pressure turbine stage 18 is located just downstream of the outlet from the combustion chamber 22 and comprises a bladed stator 34 and a rotor wheel 37. A low-pressure turbine stage 26 is located downstream of stage 18 and also comprises a bladed stator 42 and a rotor wheel 47.

A bladed turbine stator comprises an annular row of fixed blades 34, 44 for directing the gas flux, and a turbine wheel comprises an annular row of blades 38 carried by a rotor disk 37, 47.

The external annular casing 23 also comprises, at its downstream end, an annular flange for fastening to sealing ring support flanges 50, 51 made of an abradable material.

An internal annular casing 52 extends inside the wall **22*a* and carries at its upstream end the sealing ring 50 which extends around the impeller 37 of the high-pressure turbine 18, and at its downstream end a flange for fastening to the downstream annular flange of the external casing 23. The sealing ring 51 extends around the impeller 47 of the low pressure stage 26. The internal annular casing 52 has an internal wall 53** forming a channel wall.

Each sealing ring 50, 51 comprises an internal cylindrical surface which is coated with an abradable annular layer configured to wear by friction with the tops 39 of the blades 38 of the impeller 37 in order to minimise gas leakage in this zone. This abradable layer has advantageously a thermal barrier function.

Figure 4:
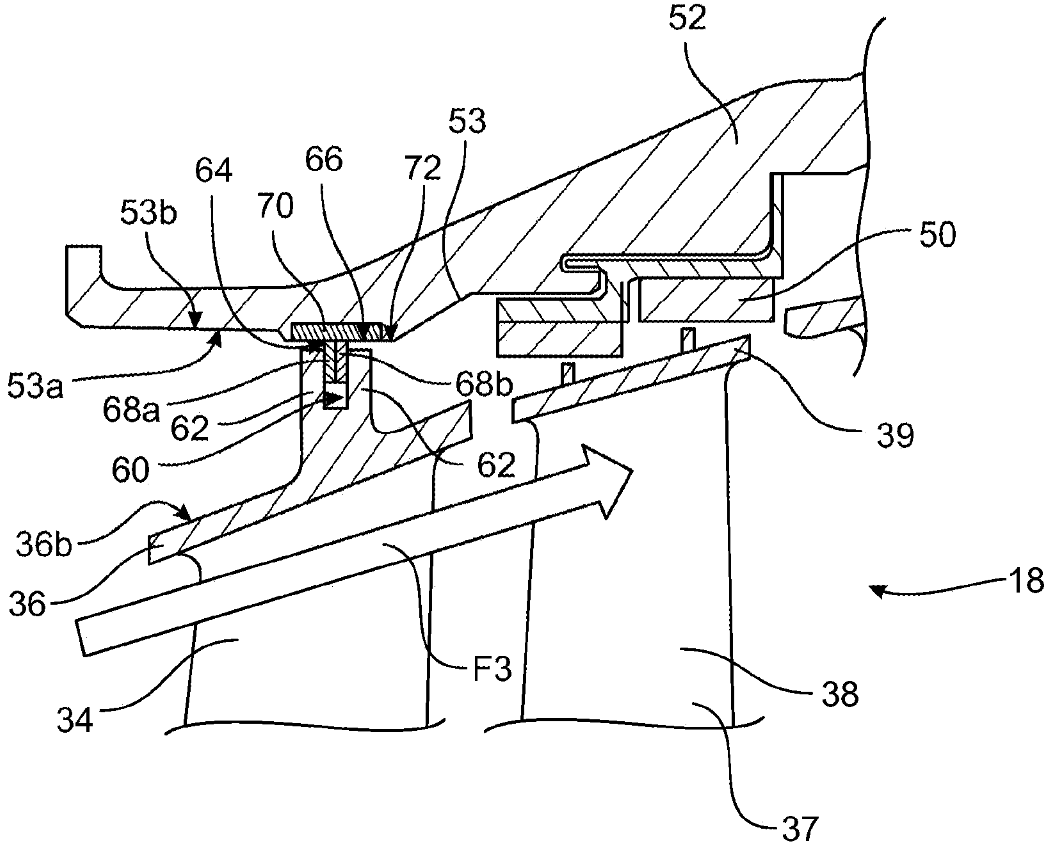
FIG. 4 shows the framed zone of the turbine engine in FIG. 2, according to one embodiment of a module according to the invention.

Reference is now made to FIG. 4, which is a schematic representation of a module of the turbine engine according to the invention. This module comprises the internal annular casing 52 housing the stator 34 of the high-pressure turbine 18 arranged just downstream of the combustion chamber outlet and just upstream of the rotor wheel 37.

The outer annular platform 36 of the stator 34 has an outer face 36*b* facing the internal wall 53 of the casing 52. The outer face 36*b* has an annular slot oriented towards the outside 60. In the illustrated example, two arms 62 extend parallel to each other in a substantially radial direction towards the outside from the outer face 36*b* of the external annular platform 36 of the stator 34. The slot 60 is formed between these two arms 62 which come together to form a U, the base of which defines the slot 60.

The slot 60 houses a sealing device 64 which comes into cylindrical contact with a track 66 on the internal wall 53 of the casing 52. The sealing device 64 comprises at least one segment seal housed in the annular slot 60.

Figure 5:
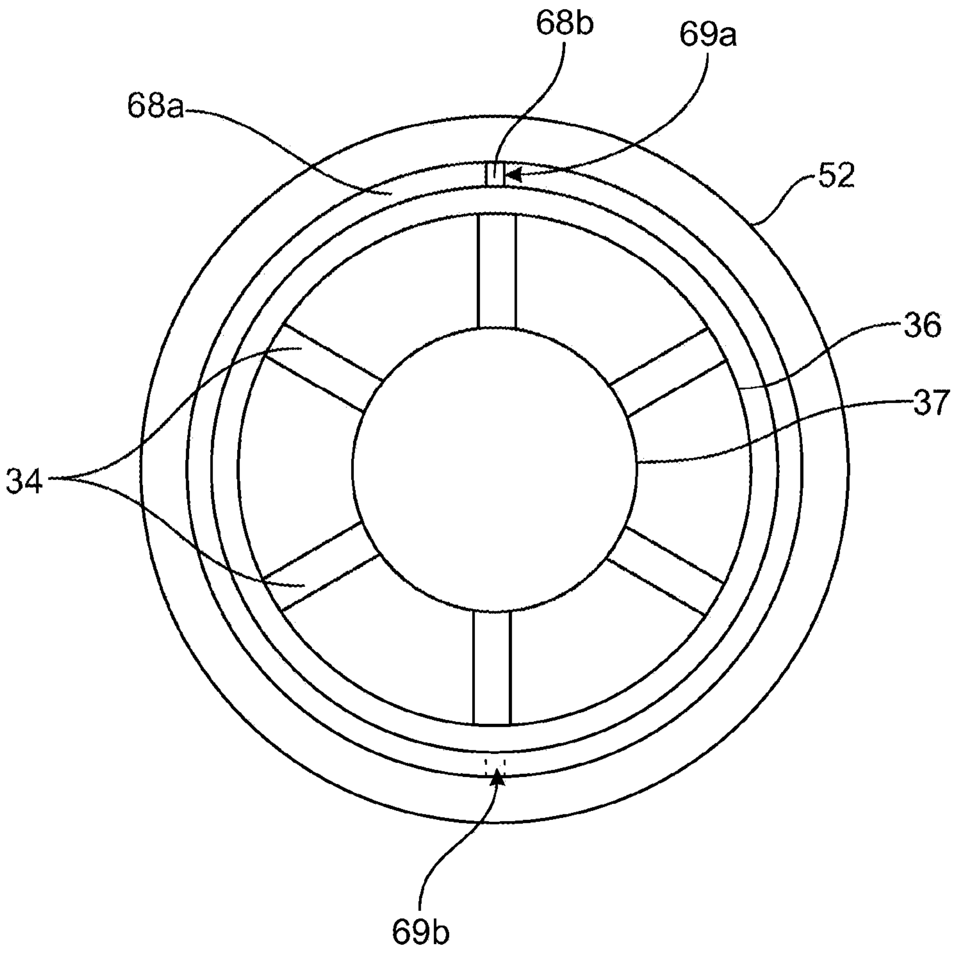
FIG. 5 shows a cross-sectional view of a sealing device according to the invention in a plane perpendicular to the longitudinal axis of the turbine engine.
Figure 6:
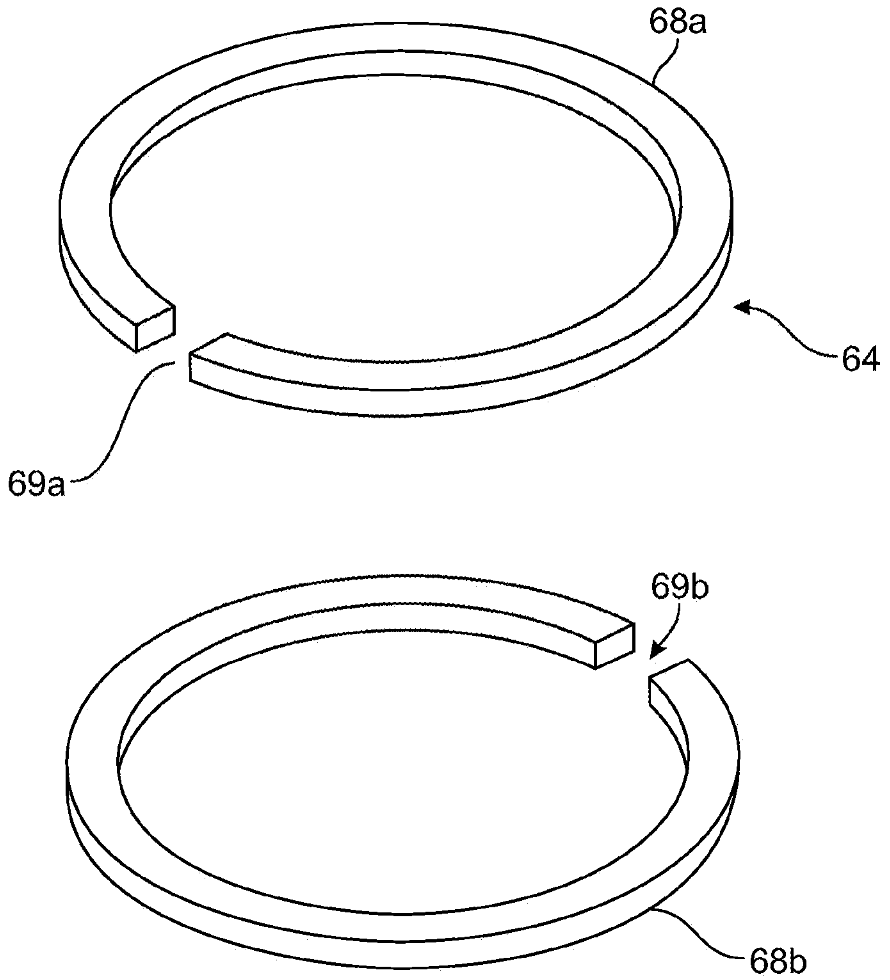
FIG. 6 shows an exploded view of the two segment seals of a sealing device.

In the example shown in FIG. 4, the sealing device 64 comprises two segment seals 68*a*, 68*b*. The segment seals 68*a*, 68*b* are fitted together and housed in the annular slot 60 on the outer face of the external platform of the rectifier. Each segment joint 68*a*, 68*b* is annular and split. The segment joints 68*a*, 68*b* are joined together so that their slits 69*a*, 69*b* are preferably diametrically opposed, as shown in FIGS. 5 and 6. FIG. 5 shows a cross-sectional view of a sealing device according to the invention in a plane perpendicular to the longitudinal axis of the turbine engine. FIG. 6 shows an exploded view of the two segment joints 68*a*, 68*b*.

According to the invention, the internal wall 53 of the casing 52 comprises a thermal barrier 70 made of ceramic material facing the track 66. For the purposes of this invention, a thermal barrier is a ceramic coating with low thermal conductivity. More specifically, the internal wall 53 of the casing has a radially inner face 53*a* and a radially outer face 53*b* opposite the inner face 53*a*. The inner face 53*a* carries the track 66 which comes into cylindrical contact with the sealing device 60. The outer face 53*b* has an annular groove 72 facing the track 66, the groove 72 having a base covered by the thermal barrier 70 made of ceramic material. The thermal barrier 70 is therefore in line with the track 66. The track 66 extends between the thermal barrier 70 and the segment seals of the sealing device 64.

Advantageously, the ceramic material of the thermal barrier has a thermal conduction coefficient substantially between 0.5 and 2.5 W/(m·° C.), and preferably between 1 and 2 W/(m·° C.) compared with a thermal conduction coefficient substantially equal to 15 W/(m·° C.) for steels. Preferably, the ceramic material of the thermal barrier is of the yttria-stabilized zirconia type (ZR02-Y203 8%). Alternatively, the ceramic material of the thermal barrier is of the ceramic matrix composite (CMC) type.

This ceramic thermal barrier 70 is projected into the groove 72 to embed it and then ground to achieve the surface finish required to seal the track 66 and limit wear on the segments 68*a*, 68*b*. This ceramic thermal barrier 70 can be easily repaired by spraying also associated with grinding.

The ceramic thermal barrier has a thickness, i.e., a dimension measured in a radial direction, of between 0.5 and 1.5 mm, and preferably between 0.8 and 1 mm.

A thermal barrier of this kind is a very good insulator, but is also fairly hard. Interposing this thermal barrier between the sealing device, in particular the segment seals in the example, and the zone to be protected from thermal conduction, in this case the internal casing 52, from the hot source (flux of air circulating in the duct) allows effective thermal insulation to be achieved while maintaining the optimum geometric properties of the initial sealing device.

This thermal barrier cuts off conductive exchanges between the bladed stator, the sealing device, in particular the segment seals in the example, and the shielding. This allows the internal casing 52 to be thermally protected from the flux of hot air circulating in the duct, thus preserving all its mechanical retention capacities.

In addition, in the example shown, a cold source is associated with the zone to be protected. This cold source is formed by a flux of fresh air from outside the turbine engine, which flows around the casing. In other words, the zone to be protected, the internal casing in the example shown, is arranged between the flux of cooling air from the cold source and the flow of hot air circulating in the duct. Such a configuration with a cold source is advantageous in terms of thermal efficiency. The fresh air flux can come from an oil circulation system, for example for cooling the bearings of the turbine engine, or from a forced ventilation system, via impact cooling devices.

In the example shown in FIGS. 4 to 6, the sealing device comprises two annular segment seals adjacent to each other. According to other variants, the sealing device comprises at least one annular seal housed in the annular slot of the outer face of the external platform of the rectifier, the seal being of the C-seal or lamellar seal or Omega seal type or a ring seal.

The invention's thermal barrier as described thus advantageously enables casings and bearings in particular to be protected both thermally and from wear caused by friction, particularly in a geometrically confined environment.

Such a solution is simple to implement, as it does not require complex mechanical assembly that can be repaired.

Of course, the invention is not limited to the above-described embodiments, which are provided by way of example only. It encompasses various modifications, alternative forms and other variants that may be envisaged by the person skilled in the art within the framework of the invention, and in particular all combinations of the various embodiments described above, which may be taken separately or in combination.

The invention claimed is:

1. A turbine engine module comprising:

an annular casing having an internal wall forming a channel wall, and a bladed stator surrounded by the casing and comprising an annular external platform and an annular internal platform between which stator blades extend, the external platform having an outer face facing the internal wall of the casing comprising an annular slot facing outwards and housing a sealing device, the sealing device coming into cylindrical contact with a track on the inner wall of the casing, wherein the internal wall of the casing comprises a thermal barrier made of ceramic material directly above the track, the track being arranged between the thermal barrier and the sealing device and the ceramic material of the thermal barrier has a thermal conduction coefficient substantially between 0.5 and 2.5 W/(m·° C.).

2. The module according to claim 1, wherein the internal wall of the casing has a radially inner face carrying the track coming into cylindrical contact with the sealing device and a radially outer face opposite the inner face and comprising an annular groove directly above the track, the groove having a bottom covered by the thermal barrier made of ceramic material.

3. The module according to claim 1, wherein the ceramic material of the thermal barrier is of the ceramic matrix composite (CMC) type.

4. The module according to claim 1, wherein the thermal barrier made of ceramic material has a thickness of between 0.5 and 1.5 mm.

5. The module according to claim 1, wherein the sealing device comprises two annular segment seals adjoining one another and housed in the annular slot of an outer face of the external platform of the bladed stator.

6. The module according to claim 1, wherein the sealing device comprises at least one annular seal housed in the annular slot of the outer face of the external platform of the bladed stator, the seal being of the C-seal or Lamella seal or Omega seal type or a segmental ring seal.

7. An aircraft turbine engine comprising a module according to claim 1.

8. The module according to claim 1, wherein the thermal barrier made of ceramic material has a thickness of between 0.8 and 1 mm.

9. A turbine engine module comprising:

an annular casing having an internal wall forming a channel wall, and a bladed stator surrounded by the casing and comprising an annular external platform and an annular internal platform between which stator blades extend, the external platform having an outer face facing the internal wall of the casing comprising an annular slot facing outwards and housing a sealing device, the sealing device coming into cylindrical contact with a track on the inner wall of the casing, wherein the internal wall of the casing comprises a thermal barrier made of ceramic material directly above the track, the track being arranged between the thermal barrier and the sealing device, and wherein the ceramic material of the thermal barrier is of the yttria-stabilized zirconia type.

10. A turbine engine module comprising:

an annular casing having an internal wall forming a channel wall, and a bladed stator surrounded by the casing and comprising an annular external platform and an annular internal platform between which stator blades extend, the external platform having an outer face facing the internal wall of the casing comprising an annular slot facing outwards and housing a sealing device, the sealing device coming into cylindrical contact with a track on the inner wall of the casing, wherein the internal wall of the casing comprises a thermal barrier made of ceramic material directly above the track, the track being arranged between the thermal barrier and the sealing device and the ceramic material of the thermal barrier has a thermal conduction coefficient substantially between 0.5 and 2.5 W/(m·° C.), and wherein the ceramic material of the thermal barrier is of the yttria-stabilized zirconia type.

11. The turbine engine module according to claim 1 wherein the ceramic material of the thermal barrier has a thermal conduction coefficient substantially between 1 and 2 W/(m·° C.).

12. The turbine engine module according to claim 10 wherein the ceramic material of the thermal barrier has a thermal conduction coefficient substantially between 1 and 2 W/(m·° C.).

13. The module according to claim 10, wherein the internal wall of the casing has a radially inner face carrying the track coming into cylindrical contact with the sealing device and a radially outer face opposite the inner face and comprising an annular groove directly above the track, the groove having a bottom covered by the thermal barrier made of ceramic material.

14. The module according to claim 10, wherein the ceramic material of the thermal barrier is of the ceramic matrix composite (CMC) type.

15. The module according to claim 10, wherein the thermal barrier made of ceramic material has a thickness of between 0.5 and 1.5 mm.

16. The module according to claim 10, wherein the sealing device comprises two annular segment seals adjoining one another and housed in the annular slot of an outer face of the external platform of the bladed stator.

17. The module according to claim 10, wherein the sealing device comprises at least one annular seal housed in the annular slot of the outer face of the external platform of the bladed stator, the seal being of the C-seal or Lamella seal or Omega seal type or a segmental ring seal.

18. An aircraft turbine engine comprising a module according to claim 10.

19. The module according to claim 10, wherein the thermal barrier made of ceramic material has a thickness of between 0.8 and 1 mm.

* * * * *